(12) United States Patent
Neuhauser et al.

(10) Patent No.: US 7,222,071 B2
(45) Date of Patent: May 22, 2007

(54) AUDIO DATA RECEIPT/EXPOSURE MEASUREMENT WITH CODE MONITORING AND SIGNATURE EXTRACTION

(75) Inventors: Alan R. Neuhauser, Silver Spring, MD (US); Thomas W. White, Annapolis, MD (US)

(73) Assignee: Arbitron Inc., Columbia, MD (US)

( * ) Notice: Subject to any disclaimer, the term of this patent is extended or adjusted under 35 U.S.C. 154(b) by 310 days.

(21) Appl. No.: 10/256,834

(22) Filed: Sep. 27, 2002

(65) Prior Publication Data

US 2004/0064319 A1   Apr. 1, 2004

(51) Int. Cl.
G10L 15/00 (2006.01)
H04H 9/00 (2006.01)

(52) U.S. Cl. ........................ 704/231; 725/22
(58) Field of Classification Search .......... 704/207, 704/231, 237; 725/18–22; 455/2.01, 2; 375/130; 380/3

See application file for complete search history.

(56) References Cited

U.S. PATENT DOCUMENTS

| | | | |
|---|---|---|---|
| 2,662,168 A | 12/1953 | Scherbatsoy | |
| 3,919,479 A | 11/1975 | Moon et al. | |
| 4,230,990 A | 10/1980 | Lert et al. | |
| 4,450,531 A | 5/1984 | Kenyon et al. | |
| 4,677,466 A | 6/1987 | Lert et al. | |
| 4,697,209 A | 9/1987 | Kiewit et al. | |
| 4,739,398 A | 4/1988 | Thomas et al. | |
| 4,843,562 A | 6/1989 | Kenyon et al. | |
| 4,918,730 A | 4/1990 | Schulze | |
| 4,955,070 A | 9/1990 | Welsh et al. | |
| 4,972,471 A | 11/1990 | Gross et al. | |
| 5,319,735 A | 6/1994 | Preuss et al. | |
| 5,425,100 A | 6/1995 | Thomas et al. | |
| 5,450,490 A | 9/1995 | Jensen et al. | |
| 5,481,294 A | 1/1996 | Thomas et al. | |
| 5,512,933 A | 4/1996 | Wheatley et al. | |
| 5,574,962 A | 11/1996 | Fardeau et al. | |
| 5,579,124 A | 11/1996 | Aijala et al. | |
| 5,581,800 A | 12/1996 | Fardeau et al. | |
| 5,594,934 A | 1/1997 | Lu et al. | |
| 5,612,729 A | 3/1997 | Ellis et al. | |
| 5,764,763 A | 6/1998 | Jensen et al. | |
| 5,787,334 A | 7/1998 | Fardeau et al. | |

(Continued)

FOREIGN PATENT DOCUMENTS

WO   WO 91/11062   7/1991

(Continued)

OTHER PUBLICATIONS

Bob Patchen, Meters for the Digital Age, "An Update on Arbitron's Personal Portable Meter", TVB Research Conference, Oct. 14, 1999, pp. 1-29.*

(Continued)

Primary Examiner—David D. Knepper
(74) Attorney, Agent, or Firm—Mark Montague, Esq.; Cowan, Liebowitz & Latman, P.C.

(57) ABSTRACT

Systems and methods are provided for gathering audience measurement data relating to receipt of and/or exposure to audio data by an audience member. Audio data is monitored to detect a monitoring code. Based on detection of the monitoring code, a signature characterizing the audio data is extracted.

128 Claims, 12 Drawing Sheets

U.S. PATENT DOCUMENTS

| | | | |
|---|---|---|---|
| 5,796,785 A * | 8/1998 | Spiero | 375/316 |
| 5,828,325 A | 10/1998 | Wolosewicz et al. | |
| 5,945,932 A | 8/1999 | Smith et al. | |
| 6,154,484 A | 11/2000 | Lee et al. | |
| 6,175,627 B1 | 1/2001 | Petrovich et al. | |

FOREIGN PATENT DOCUMENTS

| | | |
|---|---|---|
| WO | WO 95/12278 | 5/1995 |
| WO | WO 96/27264 | 9/1996 |
| WO | WO 98/10539 | 3/1998 |
| WO | WO 98/26529 | 6/1998 |
| WO | WO 98/32251 | 7/1998 |
| WO | WO 99/59275 | 11/1999 |
| WO | WO 00/04662 | 1/2000 |
| WO | WO 00/72309 | 11/2000 |

OTHER PUBLICATIONS

The Manchester 300, Out of the Lab and into the Field (A Report on the Extended Field Test of Arbitron's Portable People meter in Manchester, England), 2000, pp. 1-23.*

Stephen Kenyon and Laura Simkins, "High Capacity Real Time Broadcast Monitoring", Systems, Man, and Cybernetics, 1991, IEEE Int'l Conf. on Decision Aiding for Complex Systems, vol. 1, Oct. 13-19, 1991, pp. 147-152.*

* cited by examiner

AUDIO DATA RECEIPT/EXPOSURE MEASUREMENT WITH CODE MONITORING AND SIGNATURE EXTRACTION

FIELD OF THE INVENTION

The invention relates to systems and methods for gathering data reflecting receipt of, and/or exposure to, audio data by detecting a code in, and extracting a signature from, audio data.

BACKGROUND OF THE INVENTION

There is considerable interest in identifying and/or measuring the receipt of, and or exposure to, audio data by an audience in order to provide market information to advertisers, media distributors, and the like, to verify airing, to calculate royalties, to detect piracy, and for any other purposes for which an estimation of audience receipt or exposure is desired.

The emergence of multiple, overlapping media distribution pathways, as well as the wide variety of available user systems (e.g. PC's, PDA's, portable CD players, Internet, appliances, TV, radio, etc.) for receiving audio data, has greatly complicated the task of measuring audience receipt of, and exposure to, individual program segments. The development of commercially viable techniques for encoding audio data with program identification data provides a crucial tool for measuring audio data receipt and exposure across multiple media distribution pathways and user systems.

One such technique involves adding an ancillary code to the audio data that uniquely identifies the program signal. Most notable among these techniques is the CBET methodology developed by Arbitron Inc., which is already providing useful audience estimates to numerous media distributors and advertisers.

An alternative technique for identifying program signals is extraction and subsequent pattern matching of "signatures" of the program signals. Such techniques typically involve the use of a reference signature database, which contains a reference signature for each program signal the receipt of which, and exposure to which, is to be measured. Before the program signal is broadcast, these reference signatures are created by measuring the values of certain features of the program signal and creating a feature set or "signature" from these values, commonly termed "signature extraction", which is then stored in the database. Later, when the program signal is broadcast, signature extraction is again performed, and the signature obtained is compared to the reference signatures in the database until a match is found and the program signal is thereby identified.

However, one disadvantage of using such pattern matching techniques is that, because there is no predetermined point in the program signal from which signature extraction is designated to begin, each program signal must continually undergo signature extraction, and each of these many successive signatures extracted from a single program signal must be compared to each of the reference signatures in the database. This, of course, requires a tremendous amount of data processing, which, due to the ever increasing methods and amounts of audio data transmission, is becoming more and more economically impractical.

In order to address the problems accompanying continuous extraction and comparison of signals, which uses excessive computer processing and storage resources, it has been proposed to use a "start code" to trigger a signature extraction.

One such technique, which is disclosed in U.S. Pat. No. 4,230,990 to Lert, et al., proposes the introduction of a brief "cue" or "trigger" code into the audio data. According to Lert, et al. upon detection of this code, a signature is extracted from a portion of the signal preceding or subsequent to the code. This technique entails the use of a code having a short duration to avoid audibility but which contains sufficient information to indicate that the program signal is a signal of the type from which a signature should be extracted. The presence of this code indicates the precise point in the signal at which the signature is to be extracted, which is the same point in the signal from which a corresponding reference signature was extracted prior to broadcast, and thus, a signature need be extracted from the program signal only once. Therefore, only one signature for each program signal must be compared against the reference signatures in the database, thereby greatly reducing the amount of data processing and storage required.

One disadvantage of this technique, however, is that the presence of a code that triggers the extraction of a signature from a portion of the signal before or after the portion of the signal that has been encoded necessarily limits the amount of information that can be obtained for producing the signature, as the encoded portion itself may contain information useful for producing the signature, and moreover, may contain information required to measure the values of certain features, such as changes of certain properties or ratios over time, which might not be accurately measured when a temporal segment of the signal (i.e. the encoded portion) cannot be used.

Another disadvantage of this technique is that, because the trigger code is of short duration, the likelihood of its detection is reduced. One disadvantage of such short codes is the diminished probability of detection that may result when a signal is distorted or obscured, as is the case when program signals are broadcast in acoustic environments. In such environments, which often contain significant amounts of noise, the trigger code will often be overwhelmed by noise, and thus, not be detected.

Yet another specific disadvantage of such short codes is the diminished probability of detection that may result when certain portions of a signal are unrecoverable, such as when burst errors occur during transmission or reproduction of encoded audio signals. Burst errors may appear as temporally contiguous segments of signal error. Such errors generally are unpredictable and substantially affect the content of an encoded audio signal. Burst errors typically arise from failure in a transmission channel or reproduction device due to external interferences, such as overlapping of signals from different transmission channels, an occurrence of system power spikes, an interruption in normal operations, an introduction of noise contamination (intentionally or otherwise), and the like. In a transmission system, such circumstances may cause a portion of the transmitted encoded audio signals to be entirely unreceivable or significantly altered. Absent retransmission of the encoded audio signal, the affected portion of the encoded audio may be wholly unrecoverable, while in other instances, alterations to the encoded audio signal may render the embedded information signal undetectable.

In systems for acoustically reproducing audio signals recorded on media, a variety of factors may cause burst errors in the reproduced acoustic signal. Commonly, an irregularity in the recording media, caused by damage, obstruction, or wear, results in certain portions of recorded audio signals being irreproducible or significantly altered upon reproduction. Also, misalignment of, or interference with, the recording or reproducing mechanism relative to the recording medium can cause burst-type errors during an acoustic reproduction of recorded audio signals. Further, the acoustic limitations of a speaker as well as the acoustic characteristics of the listening environment may result in spatial irregularities in the distribution of acoustic energy. Such irregularities may cause burst errors to occur in received acoustic signals, interfering with recovery of the trigger code.

A further disadvantage of this technique is that reproduction of a single, short-lived code that triggers signature extraction does not reflect the receipt of a signal by any audience member who was exposed to part, or even most, of the signal if the audience member was not present at the precise point at which the portion of the signal containing the trigger code was broadcast. Regardless of what point in a signal such a code is placed, it would always be possible for audience members to be exposed to the signal for nearly half of the signal's duration without being exposed to the trigger code.

Yet another disadvantage of this technique is that a single code of short duration that triggers signature extraction does not provide any data reflecting the amount of time for which an audience member was exposed to the audio data. Such data may be desirable for many reasons, such as, for example, to determine the percentage of audience members who listen to the entirety of a particular commercial or to determine the level of exposure of certain portions of commercials broadcast at particular times of interest, such as, for example, the first half of the first commercial broadcast, or the last half of the last commercial broadcast, during a commercial break of a feature program.

Still another disadvantage of this technique is that a single code that triggers signature extraction cannot mark "beginning" and "end" portions of a program segment, which may be desired, for example, to determine the time boundaries of the segment.

Accordingly, it is desired to provide techniques for gathering data reflecting receipt of and/or exposure to audio data that require minimal processing and storage resources.

It is also desired to provide techniques for gathering data reflecting receipt of and/or exposure to audio data wherein the maximum possible amount of information in the audio data is available for use in creating a signature.

It is also desired to provide techniques for gathering data reflecting receipt of and/or exposure to audio data wherein a start code for triggering the extraction of a signature is easily detected.

It is also desired to provide techniques for gathering data reflecting receipt of and/or exposure to audio data wherein a start code for triggering the extraction of a signature can be detected in noisy environments.

It is also desired to provide techniques for gathering data reflecting receipt of and/or exposure to audio data wherein a start code for triggering the extraction of a signature can be detected when burst errors occur during the broadcast of the audio data.

It is also desired to provide techniques for gathering data reflecting receipt of and/or exposure to audio data wherein a start code for triggering the extraction of a signature can be detected even when an audience member is only present for part of the audio data's broadcast.

It is also desired to provide techniques for gathering data reflecting receipt of and/or exposure to audio data wherein the duration of an audience member's exposure to a program signal can be measured.

It is also desired to provide techniques for gathering data reflecting receipt of and/or exposure to audio data wherein the beginning and end of a program signal can be determined.

It is also desired to provide such data gathering techniques which are likely to be adaptable to future media distribution paths and user systems which are presently unknown.

SUMMARY OF THE INVENTION

For this application, the following terms and definitions shall apply, both for the singular and plural forms of nouns and for all verb tenses:

The term "data" as used herein means any indicia, signals, marks, domains, symbols, symbol sets, representations, and any other physical form or forms representing information, whether permanent or temporary, whether visible, audible, acoustic, electric, magnetic, electromagnetic, or otherwise manifested. The term "data" as used to represent predetermined information in one physical form shall be deemed to encompass any and all representations of the same predetermined information in a different physical form or forms.

The term "audio data" as used herein means any data representing acoustic energy, including, but not limited to, audible sounds, regardless of the presence of any other data, or lack thereof, which accompanies, is appended to, is superimposed on, or is otherwise transmitted or able to be transmitted with the audio data.

The term "network" as used herein means networks of all kinds, including both intra-networks, such as a single-office network of computers, and inter-networks, such as the Internet, and is not limited to any particular such network.

The term "source identification code" as used herein means any data that is indicative of a source of audio data, including, but not limited to, (a) persons or entities that create, produce, distribute, reproduce, communicate, have a possessory interest in, or are otherwise associated with the audio data, or (b) locations, whether physical or virtual, from which audio data is communicated, either originally or as an intermediary, and whether the audio data is created therein or prior thereto.

The terms "audience" and "audience member" as used herein mean a person or persons, as the case may be, who access media data in any manner, whether alone or in one or more groups, whether in the same or various places, and whether at the same time or at various different times.

The term "processor" as used herein means data processing devices, apparatus, programs, circuits, systems, and subsystems, whether implemented in hardware, software, or both.

The terms "communicate" and "communicating" as used herein include both conveying data from a source to a destination, as well as delivering data to a communications medium, system or link to be conveyed to a destination. The term "communication" as used herein means the act of communicating or the data communicated, as appropriate.

The terms "coupled", "coupled to", and "coupled with" shall each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, or (c) a functional relationship in which the operation of any one or more of the relevant devices, apparatus, files, programs, media, components, networks, systems, subsystems, or means depends, in whole or in part, on the operation of any one or more others thereof.

In accordance with one aspect of the present invention, a method is provided for gathering data reflecting receipt of and/or exposure to audio data. The method comprises receiving audio data to be monitored in a monitoring device, the audio data having a monitoring code indicating that the audio data is to be monitored; detecting the monitoring code; and, in response to detection of the monitoring code, producing signature data characterizing the audio data using at least a portion of the audio data containing the monitoring code.

In accordance with another aspect of the present invention, a system is provided for gathering data reflecting receipt of and/or exposure to audio data. The system comprises an input device to receive, in a monitoring device, audio data having a monitoring code indicating that the audio data is to be monitored; a detector to detect the monitoring code; and a first processor to produce, in response to detection of the monitoring code, signature data characterizing the audio data using at least a portion of the audio data containing the monitoring code.

In accordance with a further aspect of the present invention, a method is provided for gathering data reflecting receipt of and/or exposure to audio data. The method comprises receiving audio data to be monitored in a monitoring device, the audio data having a monitoring code occurring continuously throughout a time base of the audio data; detecting the monitoring code; and, in response to detection of the monitoring code, producing signature data characterizing the audio data.

In accordance with yet another aspect of the present invention, a system is provided for gathering data reflecting receipt of and/or exposure to audio data. The system comprises an input device to receive, in a monitoring device, audio data to be monitored having a monitoring code occurring continuously throughout a time base of the audio data; a detector to detect the monitoring code; and a first processor to produce, in response to detection of the monitoring code, signature data characterizing the audio data.

In accordance with still another aspect of the present invention, a method is provided for gathering data reflecting receipt of and/or exposure to audio data. The method comprises receiving audio data to be monitored in a monitoring device, the audio data having a monitoring code occurring repeatedly therein; detecting the monitoring code; and, in response to detection of the monitoring code, producing signature data characterizing the audio data.

In accordance with a further aspect of the present invention, a system is provided for gathering data reflecting receipt of and/or exposure to audio data. The system comprises an input device to receive, in a monitoring device, audio data to be monitored having a monitoring code occurring repeatedly therein; a detector to detect the monitoring code; and a first processor to produce, in response to detection of the monitoring code, signature data characterizing the audio data.

The invention and its particular features and advantages will become more apparent from the following detailed description considered with reference to the accompanying drawings, in which the same elements depicted in different drawing figures are assigned the same reference numerals.

DETAILED DESCRIPTION OF CERTAIN ADVANTAGEOUS EMBODIMENTS

Figure 1:
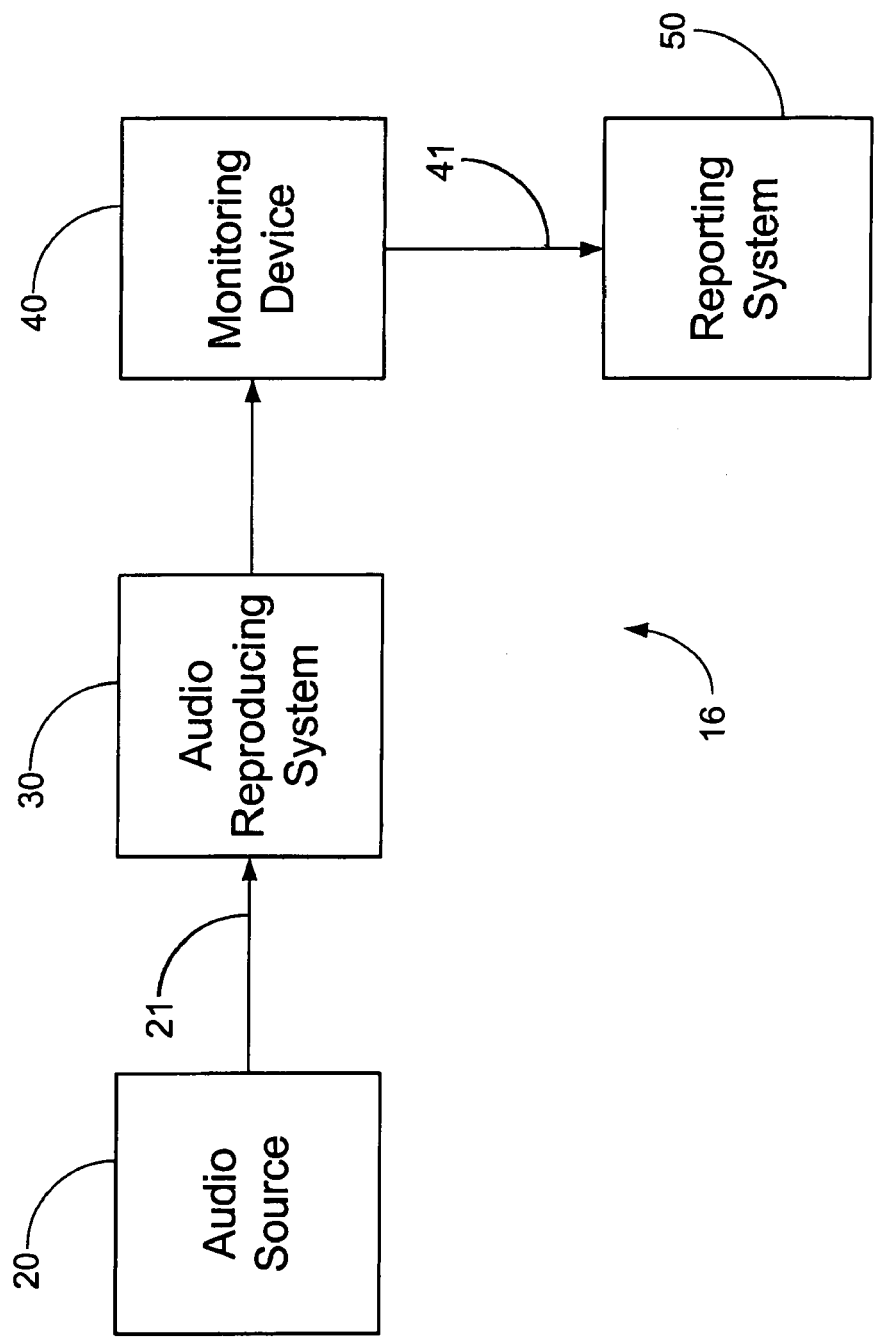
FIG. 1 is a functional block diagram for use in illustrating systems and methods for gathering data reflecting receipt and/or exposure to audio data in accordance with various embodiments of the present invention.

FIG. 1 illustrates various embodiments of a system 16 including an implementation of the present invention for gathering data reflecting receipt of and/or exposure to audio data. The system 16 includes an audio source 20 that communicates audio data to an audio reproducing system 30. While source 20 and system 30 are shown as separate boxes in FIG. 1, this illustration serves only to represent the path of the audio data, and not necessarily the physical arrangement of the devices. For example, the source 20 and the system 30 may be located either at a single location or at separate locations remote from each other. Further, the source 20 and the system 30 may be, or be located within, separate devices coupled to each other, either permanently or temporarily/intermittently, or one may be a peripheral of the other or of a device of which the other is a part, or both may be located within a single device, as will be further explained below.

The particular audio data to be monitored varies between particular embodiments and can include any audio data which may be reproduced as acoustic energy, the measurement of the receipt of which, or exposure to which, may be desired. In certain advantageous embodiments, the audio data represents commercials having an audio component, monitored, for example, in order to estimate audience exposure to commercials or to verify airing. In other embodiments, the audio data represents other types of programs having an audio component, including, but not limited to, television programs or movies, monitored, for example, in order to estimate audience exposure or verify their broadcast. In yet other embodiments, the audio data represents songs, monitored, for example, in order to calculate royalties or detect piracy. In still other embodiments, the audio data represents streaming media having an audio component, monitored, for example, in order to estimate audience exposure. In yet other embodiments, the audio data represents other types of audio files or audio/video files, monitored, for example, for any of the reasons discussed above.

The audio data 21 communicated from the audio source 20 to the system 30 includes a monitoring code, which code indicates that signature data is to be formed from at least a portion of the audio data relative to the monitoring code. The monitoring code is present in the audio data at the audio source 20 and is added to the audio data at the audio source 20 or prior thereto, such as, for example, in the recording studio or at any other time the audio is recorded or re-recorded (i.e. copied) prior to its communication from the audio source 20 to the system 30.

The monitoring code may be added to the audio data using any encoding technique suitable for encoding audio signals that are reproduced as acoustic energy, such as, for example, the techniques disclosed in U.S. Pat. No. 5,764,763 to Jensen, et al., and modifications thereto, which is assigned to the assignee of the present invention and which is incorporated herein by reference. Other appropriate encoding techniques are disclosed in U.S. Pat. No. 5,579,124 to Aijala, et al., U.S. Pat. Nos. 5,574,962, 5,581,800 and 5,787,334 to Fardeau, et al., U.S. Pat. No. 5,450,490 to Jensen, et al., and U.S. patent application Ser. No. 09/318,045, in the names of Neuhauser, et al., each of which is assigned to the assignee of the present application and all of which are incorporated herein by reference.

Still other suitable encoding techniques are the subject of PCT Publication WO 00/04662 to Srinivasan, U.S. Pat. No. 5,319,735 to Preuss, et al., U.S. Pat. No. 6,175,627 to Petrovich, et al., U.S. Pat. No. 5,828,325 to Wolosewicz, et al., U.S. Pat. No. 6,154,484 to Lee, et al., U.S. Pat. No. 5,945,932 to Smith, et al., PCT Publication WO 99/59275 to Lu, et al., PCT Publication WO 98/26529 to Lu, et al., and PCT Publication WO 96/27264 to Lu, et al, all of which are incorporated herein by reference.

In accordance with certain advantageous embodiments of the invention, this monitoring code occurs continuously throughout a time base of a program segment. In accordance with certain other advantageous embodiments of the invention, this monitoring code occurs repeatedly, either at a predetermined interval or at a variable interval or intervals. These types of encoded signals have certain advantages that may be desired, such as, for example, increasing the likelihood that a program segment will be identified when an audience member is only exposed to part of the program segment, or, further, determining the amount of time the audience member is actually exposed to the segment.

In another advantageous embodiment of the invention, two different monitoring codes occur in a program segment, the first of these codes occurring continuously or repeatedly throughout a first portion of a program segment, and the second of these codes occurring continuously or repeatedly throughout a second portion of the program segment. This type of encoded signal has certain advantages that may be desired, such as, for example, using the first and second codes as "start" and "end" codes of the program segment by defining the boundary between the first and second portions as the center, or some other predetermined point, of the program segment in order to determine the time boundaries of the segment.

In another advantageous embodiment of the invention, the audio data 21 communicated from the audio source 20 to the system 30 includes two (or more) different monitoring codes. This type of encoded data has certain advantages that may be desired, such as, for example, using the codes to identify two different program types in the same signal, such as a television commercial that is being broadcast along with a movie on a television, where it is desired to monitor exposure to both the movie and the commercial. Accordingly, in response to detection of each monitoring code, a signature is extracted from the audio data of the respective program.

In another advantageous embodiment, the audio data 21 communicated from the audio source 20 to the system 30 also includes a source identification code. The source identification code may include data identifying any individual source or group of sources of the audio data, which sources may include an original source or any subsequent source in a series of sources, whether the source is located at a remote location, is a storage medium, or is a source that is internal to, or a peripheral of, the system 30. In certain embodiments, the source identification code and the monitoring code are present simultaneously in the audio data 21, while in other embodiments they are present in different time segments of the audio data 21.

After the system 30 receives the audio data, in certain embodiments, the system 30 reproduces the audio data as acoustic audio data, and the system 16 further includes a monitoring device 40 that detects this acoustic audio data. In other embodiments, the system 30 communicates the audio data via a connection to monitoring device 40, or through other wireless means, such as RF, optical, magnetic and/or electrical means. While system 30 and monitoring device 40 are shown as separate boxes in FIG. 1, this illustration serves only to represent the path of the audio data, and not necessarily the physical arrangement of the devices. For example, the monitoring device 40 may be a peripheral of, or be located within, either as hardware or as software, the system 30, as will be further explained below.

After the audio data is received by the monitoring device 40, the audio data is processed until the monitoring code, with which the audio data has previously been encoded, is detected. In response to the detection of the monitoring code, the monitoring device 40 forms signature data 41 characterizing the audio data.

In certain advantageous embodiments, the audio signature data 41 is formed from at least a portion of the program segment containing the monitoring code. This type of signature formation has certain advantages that may be desired, such as, for example, the ability to use the code as part of, or as part of the process for forming, the audio signature data, as well as the availability of other information contained in the encoded portion of the program segment for use in creating the signature data.

Suitable techniques for extracting signatures from audio data are disclosed in U.S. Pat. No. 5,612,729 to Ellis, et al. and in U.S. Pat. No. 4,739,398 to Thomas, et al., each of which is assigned to the assignee of the present invention and both of which are incorporated herein by reference.

Still other suitable techniques are the subject of U.S. Pat. No. 2,662,168 to Scherbatsoy, U.S. Pat. No. 3,919,479 to Moon, et al., U.S. Pat. No. 4,697,209 to Kiewit, et al., U.S. Pat. No. 4,677,466 to Lert, et al., U.S. Pat. No. 5,512,933 to Wheatley, et al., U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,531 to Kenyon, et al., U.S. Pat. No. 4,230,990 to Lert, et al., U.S. Pat. No.

5,594,934 to Lu, et al., and PCT publication WO91/11062 to Young, et al., all of which are incorporated herein by reference.

Specific methods for forming signature data include the techniques described below. It is appreciated that this is not an exhaustive list of the techniques that can be used to form signature data characterizing the audio data.

In certain embodiments, the audio signature data 41 is formed by using variations in the received audio data. For example, in some of these embodiments, the signature 41 is formed by forming a signature data set reflecting time-domain variations of the received audio data, which set, in some embodiments, reflects such variations of the received audio data in a plurality of frequency sub-bands of the received audio data. In others of these embodiments, the signature 41 is formed by forming a signature data set reflecting frequency-domain variations of the received audio data.

In certain other embodiments, the audio signature data 41 is formed by using signal-to-noise ratios that are processed for a plurality of predetermined frequency components of the audio data and/or data representing characteristics of the audio data. For example, in some of these embodiments, the signature 41 is formed by forming a signature data set comprising at least some of the signal-to-noise ratios. In others of these embodiments, the signature 41 is formed by combining selected ones of the signal-to-noise ratios. In still others of these embodiments, the signature 41 is formed by forming a signature data set reflecting time-domain variations of the signal-to-noise ratios, which set, in some embodiments, reflects such variations of the signal-to-noise ratios in a plurality of frequency sub-bands of the received audio data, which, in some such embodiments, are substantially single frequency sub-bands. In still others of these embodiments, the signature 41 is formed by forming a signature data set reflecting frequency-domain variations of the signal-to-noise ratios.

In certain other embodiments, the signature data 41 is obtained at least in part from the monitoring code and/or from a different code in the audio data, such as a source identification code. In certain of such embodiments, the code comprises a plurality of code components reflecting characteristics of the audio data and the audio data is processed to recover the plurality of code components. Such embodiments are particularly useful where the magnitudes of the code components are selected to achieve masking by predetermined portions of the audio data. Such component magnitudes therefore, reflect predetermined characteristics of the audio data, so that the component magnitudes may be used to form a signature identifying the audio data.

In some of these embodiments, the signature 41 is formed as a signature data set comprising at least some of the recovered plurality of code components. In others of these embodiments, the signature 41 is formed by combining selected ones of the recovered plurality of code components. In yet other embodiments, the signature 41 can be formed using signal-to-noise ratios processed for the plurality of code components in any of the ways described above. In still further embodiments, the code is used to identify predetermined portions of the audio data, which are then used to produce the signature using any of the techniques described above. It will be appreciated that other methods of forming signatures may be employed.

After the signature data 41 is formed in the monitoring device 40, it is communicated to a reporting system 50, which processes the signature data to produce data representing the identity of the program segment. While monitoring device 40 and reporting system 50 are shown as separate boxes in FIG. 1, this illustration serves only to represent the path of the audio data and derived values, and not necessarily the physical arrangement of the devices. For example, the reporting system 50 may be located at the same location as, either permanently or temporarily/intermittently, or at a location remote from, the monitoring device 40. Further, the monitoring device 40 and the reporting system 50 may be, or be located within, separate devices coupled to each other, either permanently or temporarily/intermittently, or one may be a peripheral of the other or of a device of which the other is a part, or both may be located within, or implemented by, a single device.

Figure 2:
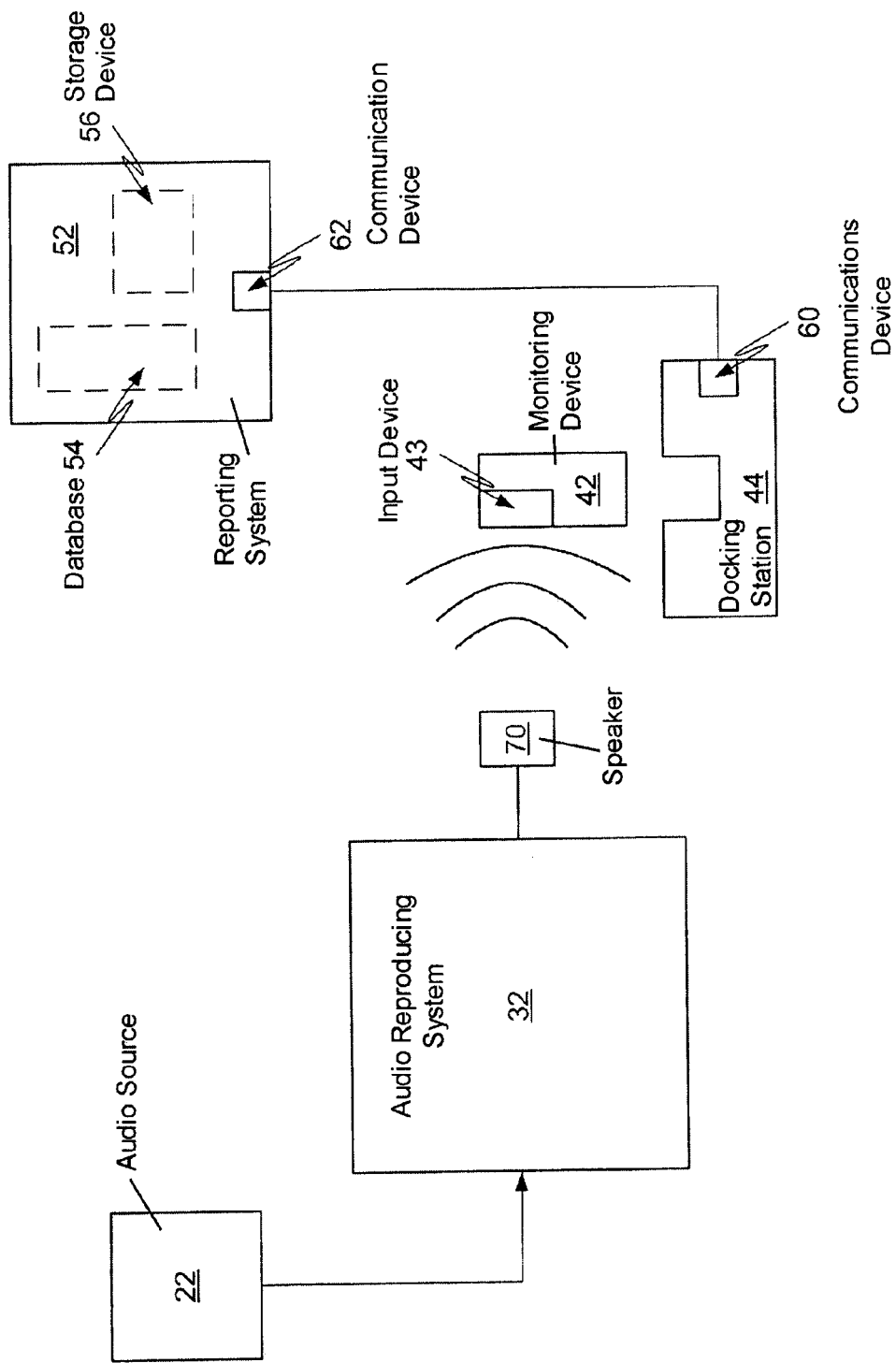
FIG. 2 is a functional block diagram for use in illustrating certain embodiments of the present invention.

As shown in FIG. 2, which illustrates certain advantageous embodiments of the system 16, the audio source 22 may be any external source capable of communicating audio data, including, but not limited to, a radio station, a television station, or a network, including, but not limited to, the Internet, a WAN (Wide Area Network), a LAN (Local Area Network), a PSTN (public switched telephone network), a cable television system, or a satellite communications system.

The audio reproducing system 32 may be any device capable of reproducing audio data from any of the audio sources referenced above, including, but not limited to, a radio, a television, a stereo system, a home theater system, an audio system in a commercial establishment or public area, a personal computer, a web appliance, a gaming console, a cell phone, a pager, a PDA (Personal Digital Assistant), an MP3 player, any other device for playing digital audio files, or any other device for reproducing prerecorded media.

The system 32 causes the audio data received to be reproduced as acoustic energy. The system 32 typically includes a speaker 70 for reproducing the audio data as acoustic audio data. While the speaker 70 may form an integral part of the system 32, it may also, as shown in FIG. 2, be a peripheral of the system 32, including, but not limited to, stand-alone speakers or headphones.

In certain embodiments, the acoustic audio data is received by a transducer, illustrated by input device 43 of monitoring device 42, for producing electrical audio data from the received acoustic audio data. While the input device 43 typically is a microphone that receives the acoustic energy, the input device 43 can be any device capable of detecting energy associated with the speaker 70, such as, for example, a magnetic pickup for sensing magnetic fields, a capacitive pickup for sensing electric fields, or an antenna or optical sensor for electromagnetic energy. In other embodiments, however, the input device 43 comprises an electrical or optical connection with the system 32 for detecting the audio data.

In certain advantageous embodiments, the monitoring device 42 is a portable monitoring device, such as, for example, a portable people meter. In these embodiments, the portable device 42 is carried by an audience member in order to detect audio data to which the audience member is exposed. In some of these embodiments, the portable device 42 is later coupled with a docking station 44, which includes or is coupled to a communications device 60, in order to communicate data to, or receive data from, at least one remotely located communications device 62.

The communications device 60 is, or includes, any device capable of performing any necessary transformations of the data to be communicated, and/or communicating/receiving the data to be communicated, to or from at least one remotely located communications device 62 via a communication system, link, or medium. Such a communications device may be, for example, a modem or network card that transforms the data into a format appropriate for communication via a telephone network, a cable television system, the Internet, a WAN, a LAN, or a wireless communications system. In embodiments that communicate the data wirelessly, the communications device 60 includes an appropriate transmitter, such as, for example, a cellular telephone transmitter, a wireless Internet transmission unit, an optical transmitter, an acoustic transmitter, or a satellite communications transmitter.

In certain advantageous embodiments, the reporting system 52 has a database 54 containing reference audio signature data of identified audio data. After audio signature data is formed in the monitoring device 42, it is compared with the reference audio signature data contained in the database 54 in order to identify the received audio data.

There are numerous advantageous and suitable techniques for carrying out a pattern matching process to identify the audio data based on the audio signature data. Some of these techniques are disclosed in U.S. Pat. No. 5,612,729 to Ellis, et al. and in U.S. Pat. No. 4,739,398 to Thomas, et al., each of which is assigned to the assignee of the present invention and both of which are incorporated herein by reference.

Still other suitable techniques are the subject of U.S. Pat. No. 2,662,168 to Scherbatsoy, U.S. Pat. No. 3,919,479 to Moon, et al., U.S. Pat. No. 4,697,209 to Kiewit, et al., U.S. Pat. No. 4,677,466 to Lert, et al., U.S. Pat. No. 5,512,933 to Wheatley, et al., U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,531 to Kenyon, et al., U.S. Pat. No. 4,230,990 to Lert, et al., U.S. Pat. No. 5,594,934 to Lu et al., and PCT Publication WO91/11062 to Young et al., all of which are incorporated herein by reference.

In certain embodiments, the signature is communicated to a reporting system 52 having a reference signature database 54, and pattern matching is carried out by the reporting system 52 to identify the audio data. In other embodiments, the reference signatures are retrieved from the reference signature database 54 by the monitoring device 42 or the docking station 44, and pattern matching is carried out in the monitoring device 42 or the docking station 44. In the latter embodiments, the reference signatures in the database can be communicated to the monitoring device 42 or the docking station 44 at any time, such as, for example, continuously, periodically, when a monitoring device 42 is coupled to a docking station 44 thereof, when an audience member actively requests such a communication, or prior to initial use of the monitoring device 42 by an audience member.

After the audio signature data is formed and/or after pattern matching has been carried out, the audio signature data, or, if pattern matching has occurred, the identity of the audio data, is stored on a storage device 56 located in the reporting system.

In certain embodiments, the reporting system 52 contains only a storage device 56 for storing the audio signature data. In other embodiments, the reporting system 52 is a single device containing both a reference signature database 54, a pattern matching subsystem (not shown for purposes of simplicity and clarity) and the storage device 56.

Figure 3:
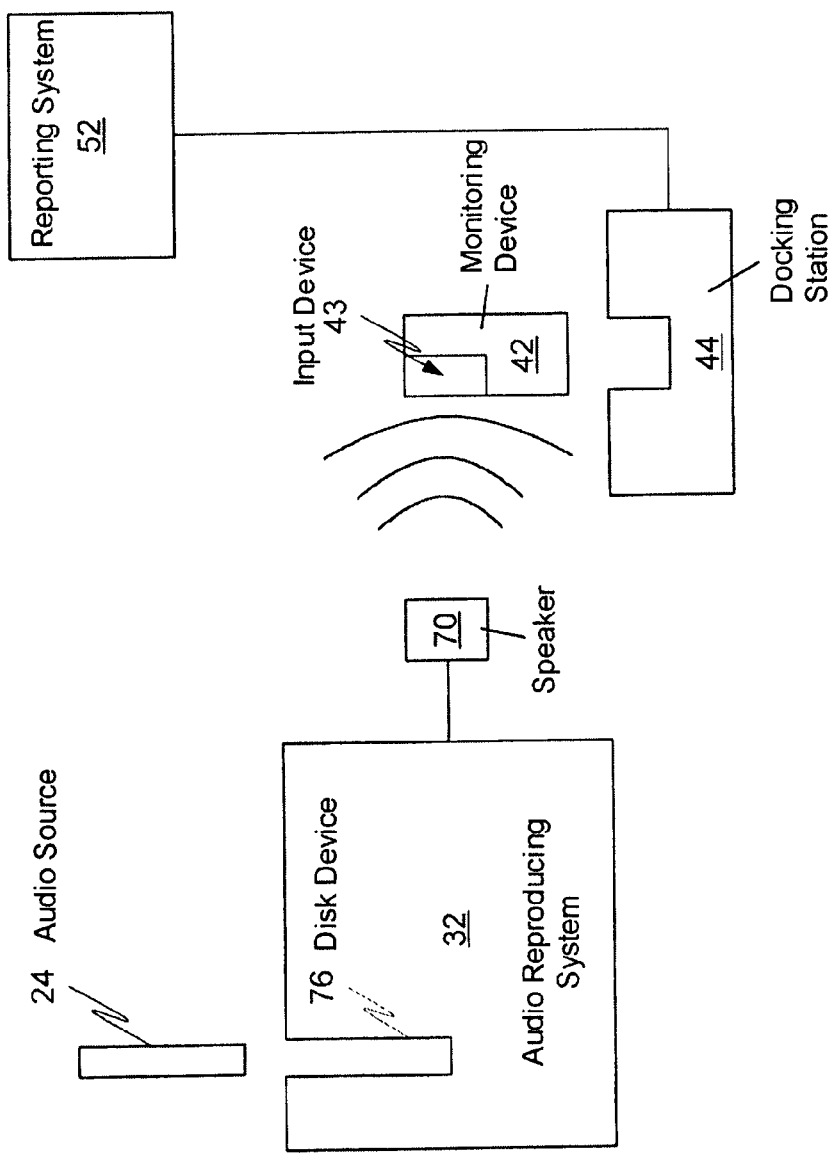
FIG. 3 is a functional block diagram for use in illustrating further embodiments of the present invention.

Referring to FIG. 3, in certain embodiments, the audio source 24 is a data storage medium containing audio data previously recorded, including, but not limited to, a diskette, game cartridge, compact disc, digital versatile disk, or magnetic tape cassette, including, but not limited to, audiotapes, videotapes, or DATs (Digital Audio Tapes). Audio data from the source 24 is read by a disk drive 76 or other appropriate device and reproduced as sound by the system 32 by means of speaker 70.

Figure 4:
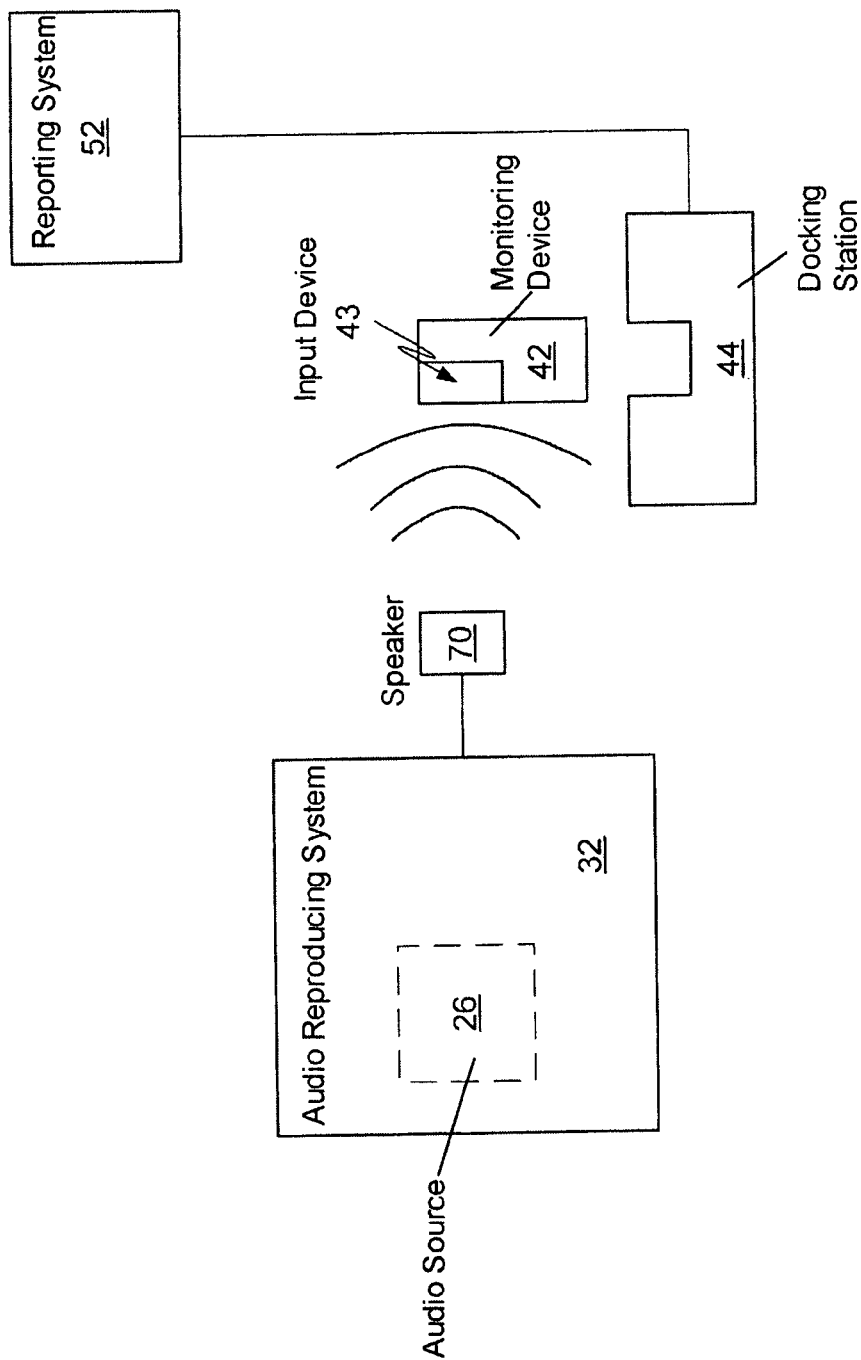
FIG. 4 is a functional block diagram for use in illustrating still further embodiments of the present invention.

In yet other embodiments, as illustrated in FIG. 4, the audio source 26 is located in the system 32, either as hardware forming an integral part or peripheral of the system 32, or as software, such as, for example, in the case where the system 32 is a personal computer, a prerecorded advertisement included as part of a software program that comes bundled with the computer.

Figure 5:
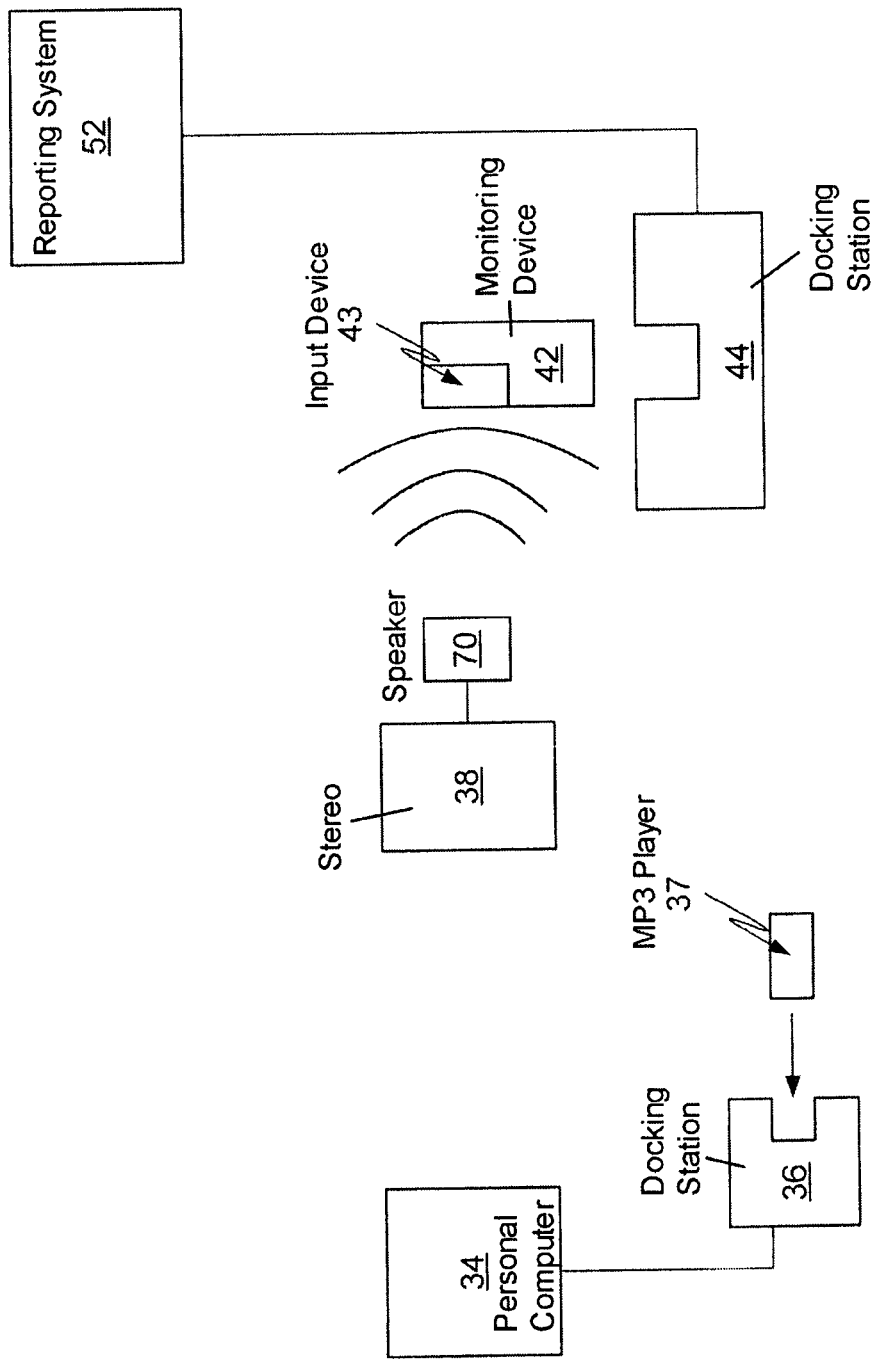
FIG. 5 is a functional block diagram for use in illustrating yet still further embodiments of the present invention.
Figure 6:
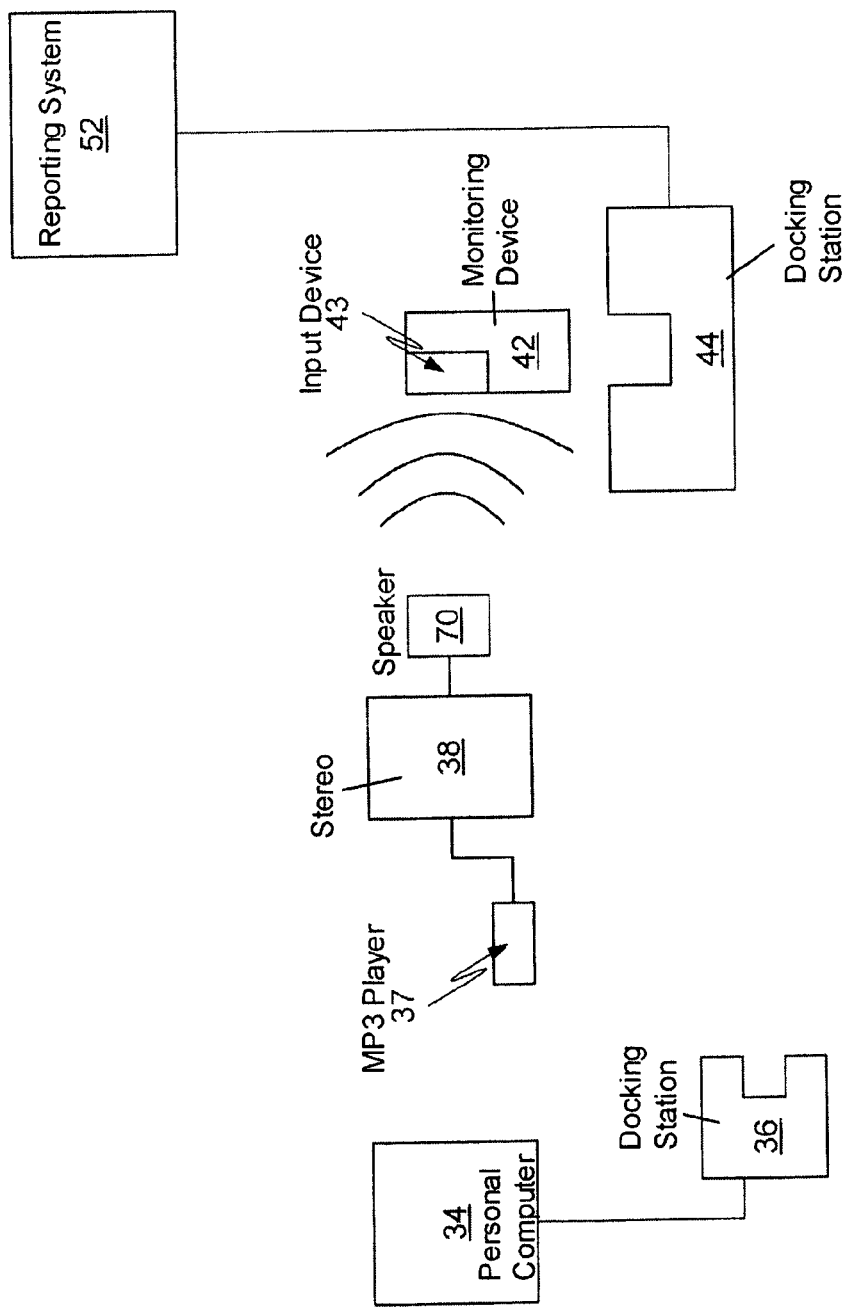
FIG. 6 is a functional block diagram for use in illustrating further embodiments of the present invention.

In still further embodiments, the source is another audio reproducing system, as defined below, such that a plurality of audio reproducing systems receive and communicate audio data in succession. Each system in such a series of systems may be coupled either directly or indirectly to the system located before or after it, and such coupling may occur, permanently, temporarily, or intermittently, as illustrated stepwise in FIGS. 5–6. Such an arrangement of indirect, intermittent couplings of systems may, for example, take the form of a personal computer 34, electrically coupled to an MP3 player docking station 36. As shown in FIG. 5, an MP3 player 37 may be inserted into the docking station 36 in order to transfer audio data from the personal computer 34 to the MP3 player 37. At a later time, as shown in FIG. 6, the MP3 player 37 may be removed from the docking station 36 and be electrically connected to a stereo 38.

Figure 7:
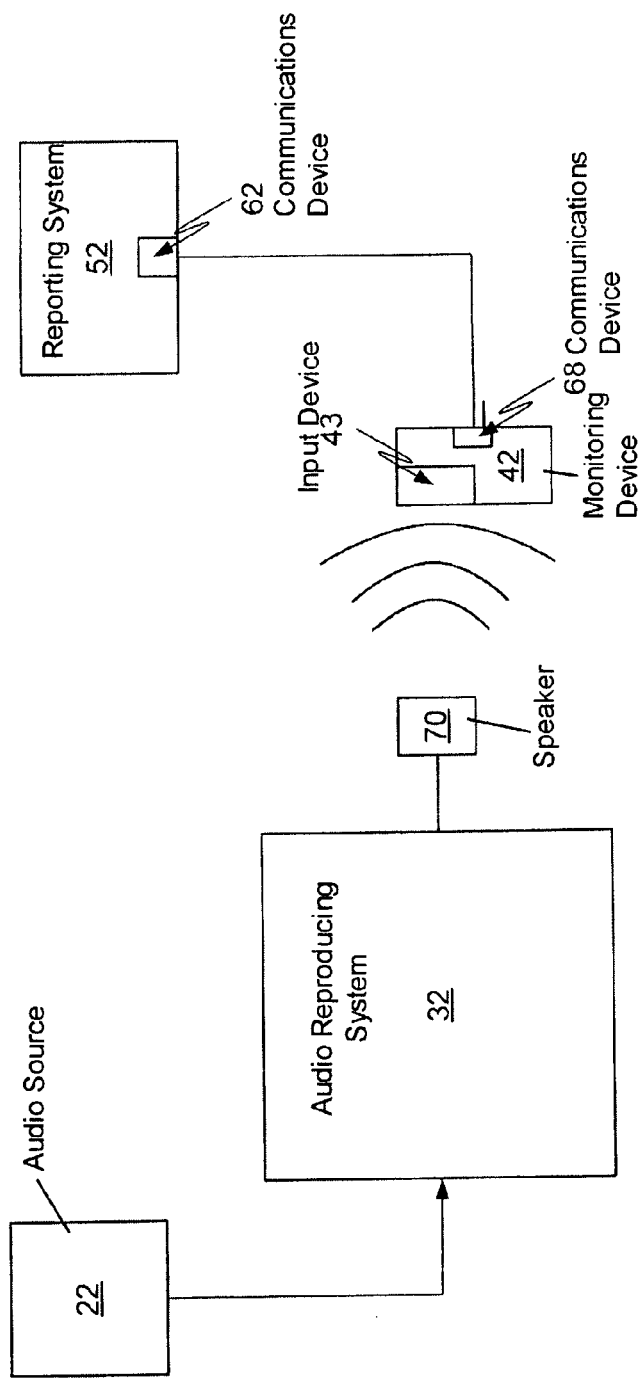
FIG. 7 is a functional block diagram for use in illustrating still further embodiments of the present invention.

Referring to FIG. 7, in certain embodiments, the portable device 42 itself includes or is coupled to a communications device 68, in order to communicate data to, or receive data from, at least one remotely located communications device 62.

Figure 8:
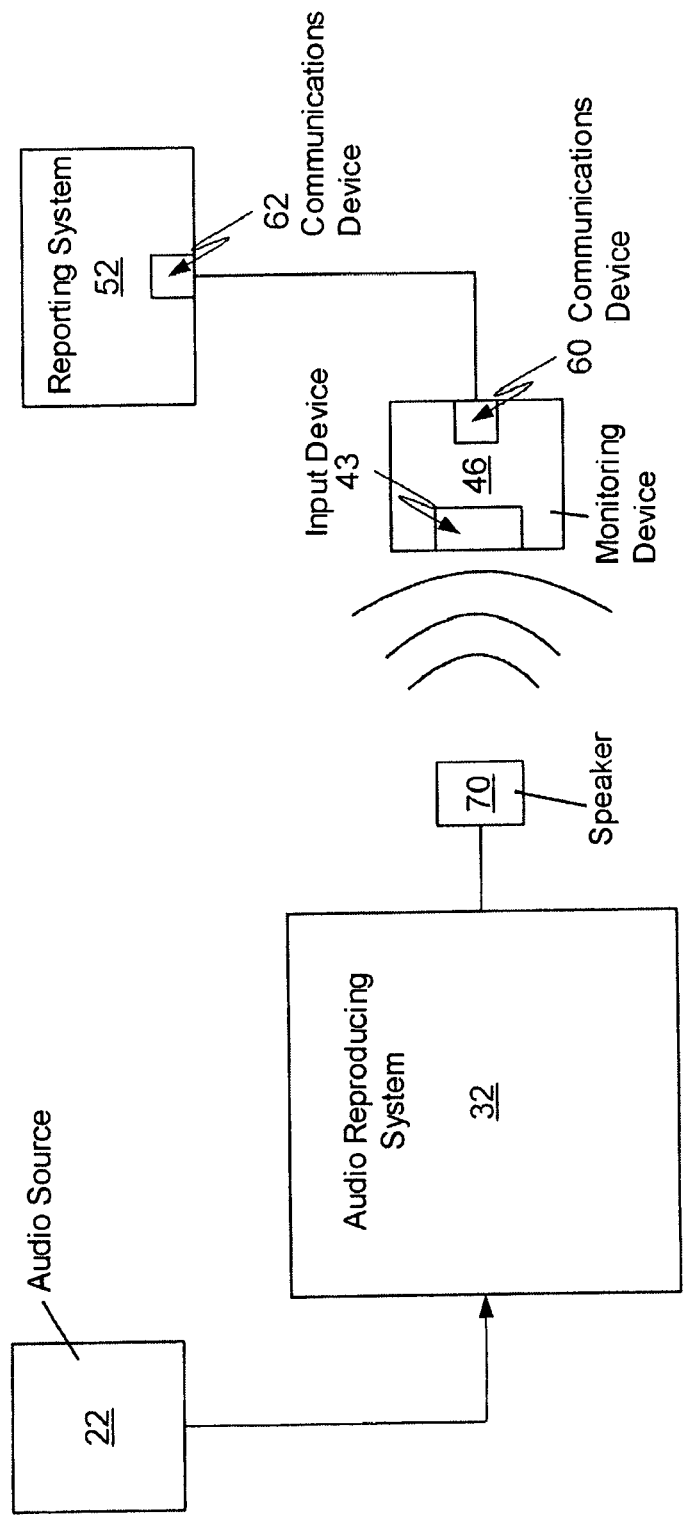
FIG. 8 is a functional block diagram for use in illustrating additional embodiments of the present invention.

In certain other embodiments, as illustrated in FIG. 8, the monitoring device 46 is a stationary monitoring device that is positioned near the system 32. In these embodiments, while a separate communications device for communicating data to, or receiving data from, at least one remotely located communications device 62 may be coupled to the monitoring device 46, the communications device 60 will typically be contained within the monitoring device 46.

Figure 9:
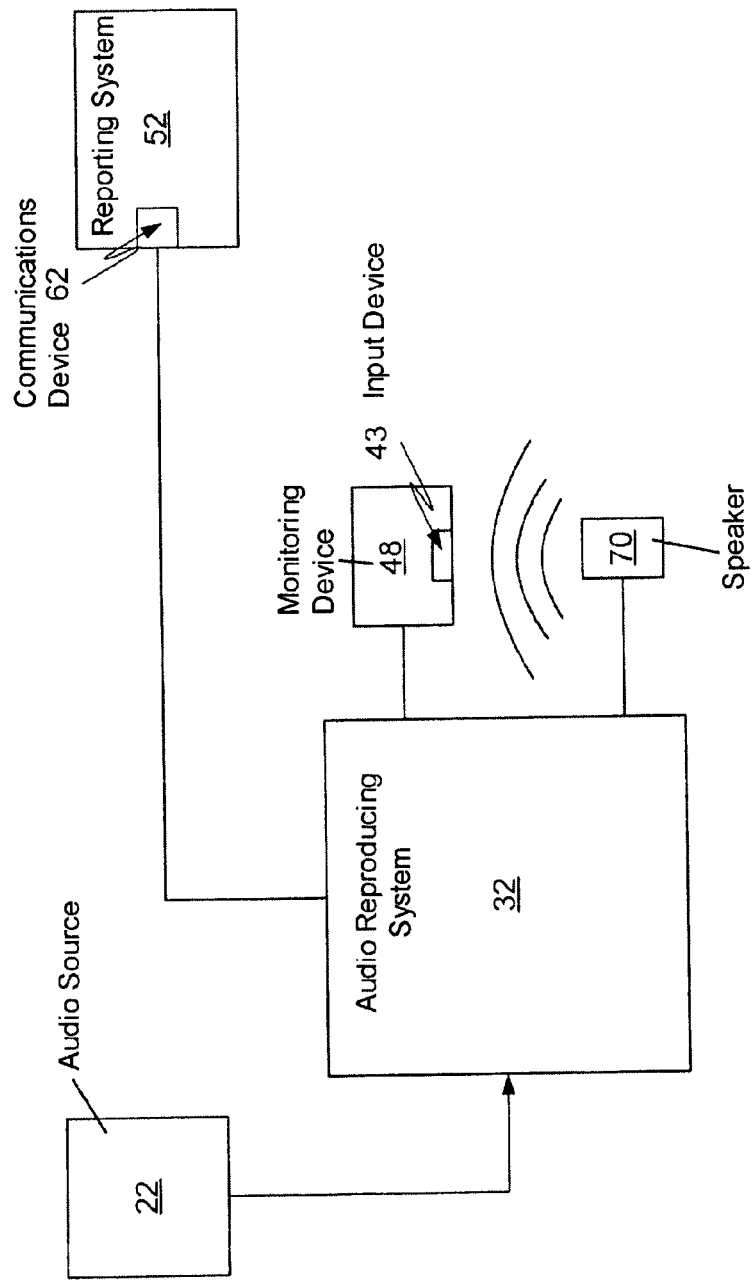
FIG. 9 is a functional block diagram for use in illustrating further additional embodiments of the present invention.

In still other embodiments, as illustrated in FIG. 9, the monitoring device 48 is a peripheral of the system 32. In these embodiments, the data to be communicated to or from at least one remotely located communications device 62 is communicated from the monitoring device 48 to the system 32, which in turn communicates the data to, or receives the data from, the remotely located communications device 62 via a communication system, link or medium.

Figure 10:
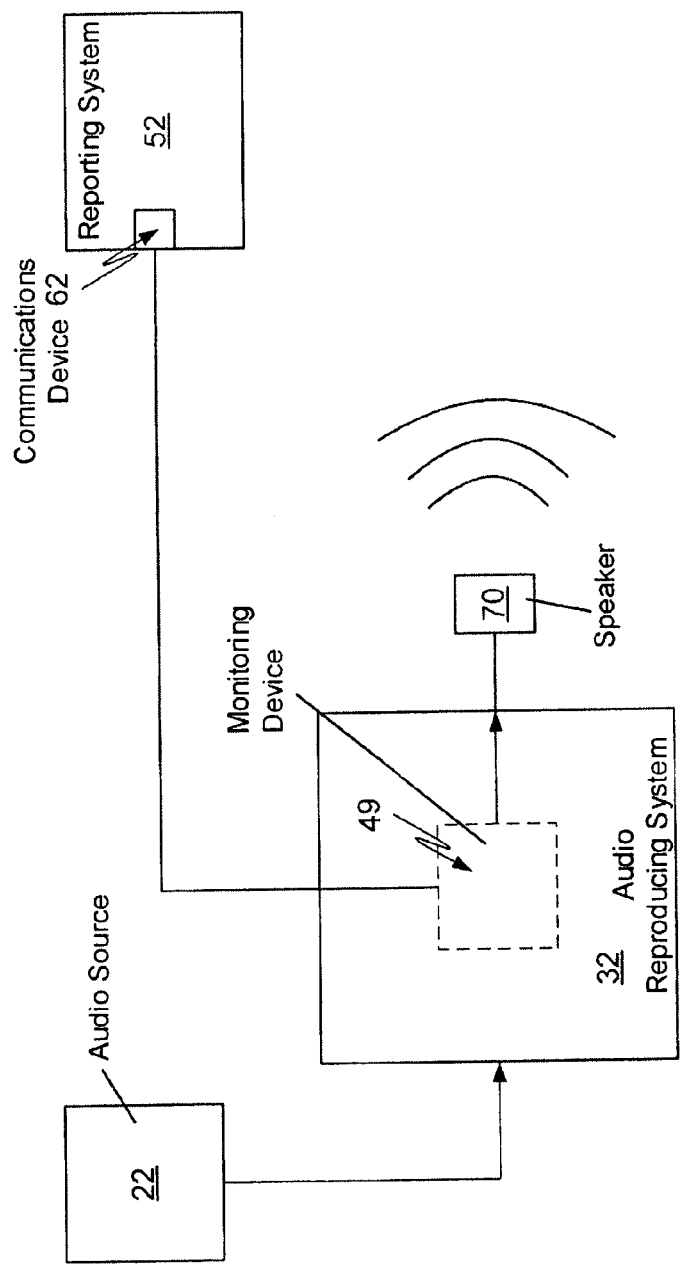
FIG. 10 is a functional block diagram for use in illustrating still further additional embodiments of the present invention.

In still further embodiments, as illustrated in FIG. 10, the monitoring device 49 is embodied in monitoring software operating in the system 32. In these embodiments, the system 32 communicates the data to be communicated to, or receives the data from, the remotely located communications device 62.

Figure 11:
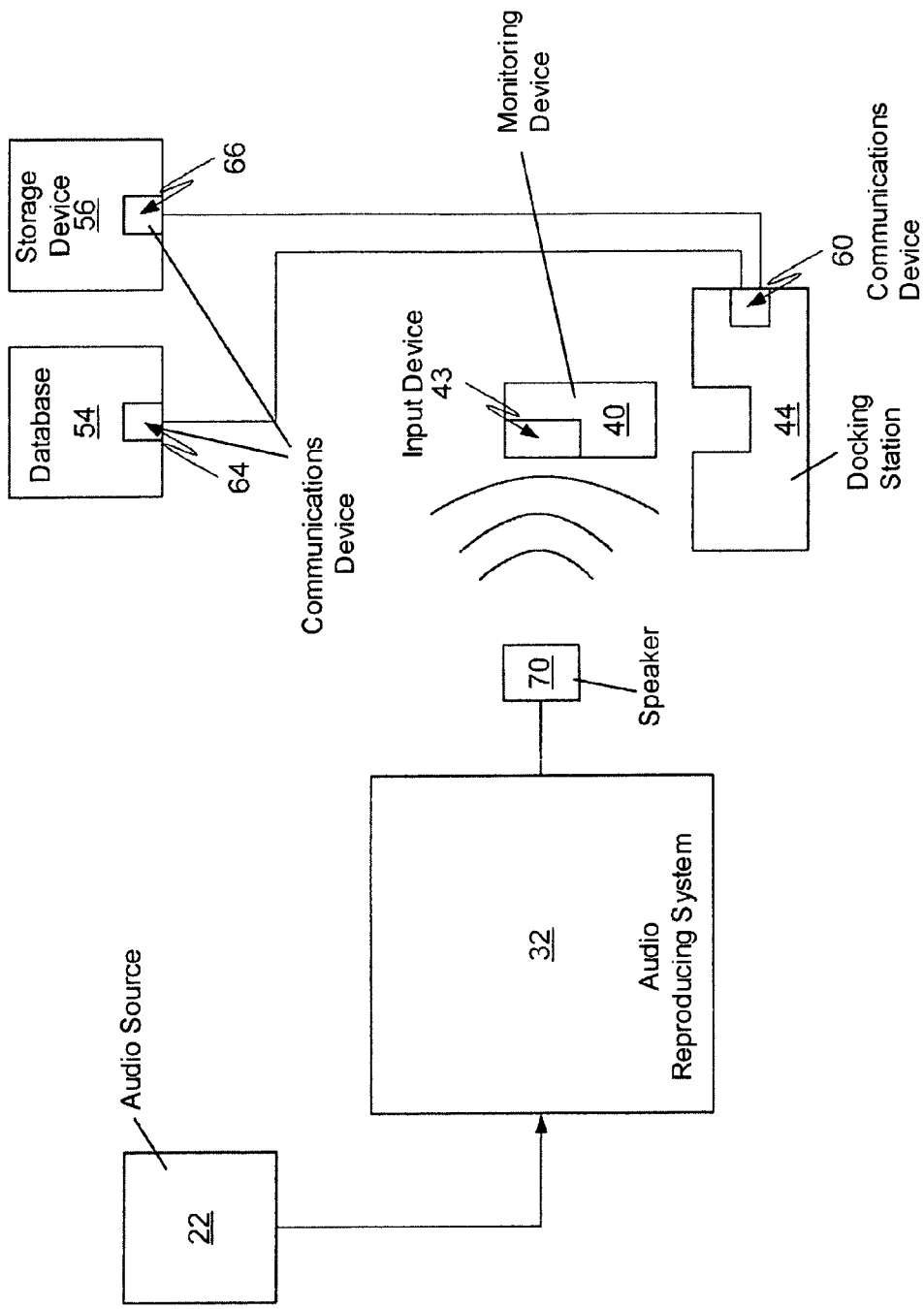
FIG. 11 is a functional block diagram for use in illustrating yet further additional embodiments of the present invention.
Figure 12:
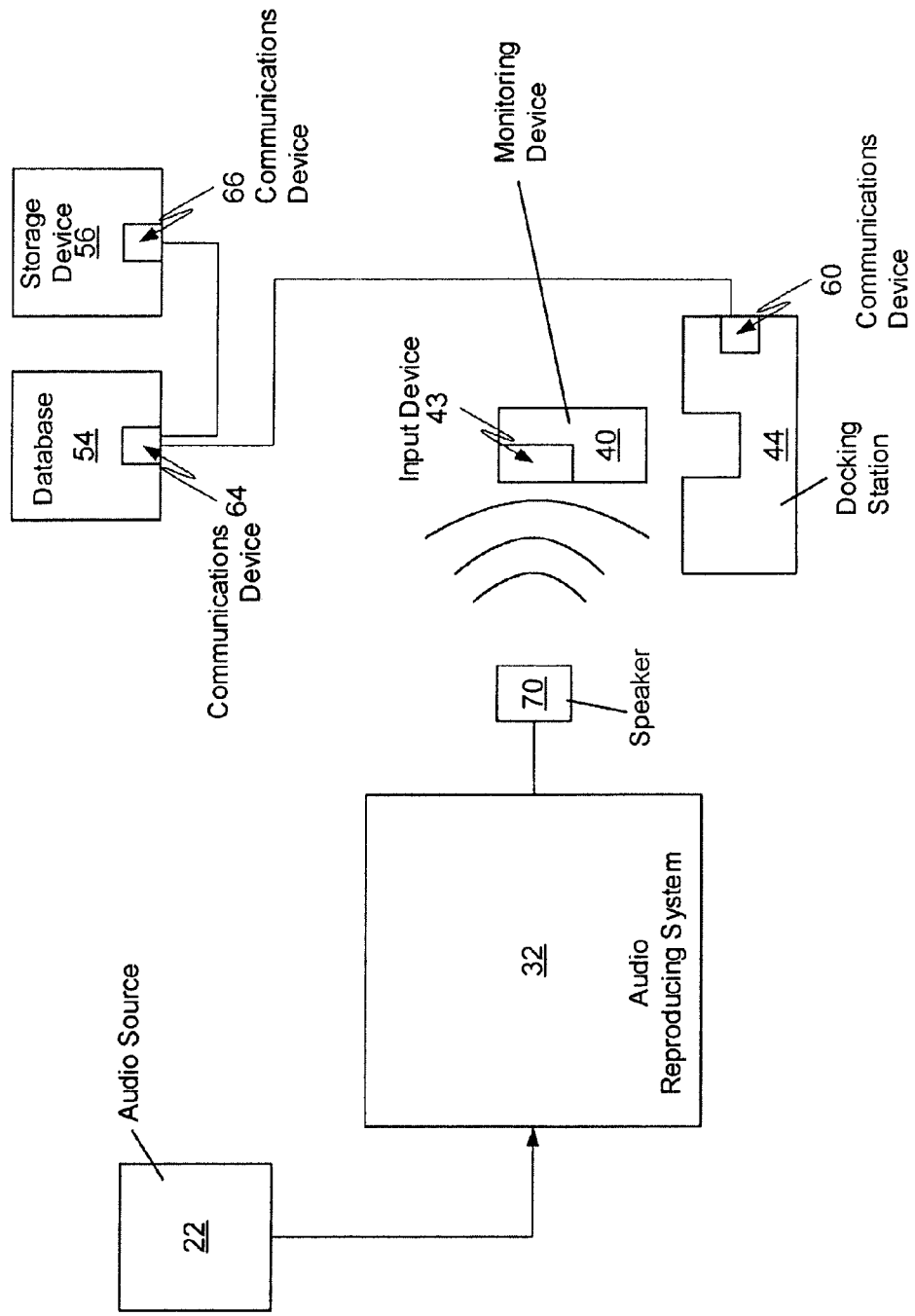
FIG. 12 is a functional block diagram for use in illustrating additional embodiments of the present invention.

Referring to FIG. 11, in certain embodiments, a reporting system comprises a database 54 and storage device 56 that are separate devices, which may be coupled to, proximate to, or located remotely from, each other, and which include communications devices 64 and 66, respectively, for communicating data to or receiving data from communications device 60. In embodiments where pattern matching occurs, data resulting from such matching may be communicated to the storage device 56 either by the monitoring device 40 or a docking station 44 thereof, as shown in FIG. 11, or by the reference signature database 54 directly therefrom, as shown in FIG. 12.

Although the invention has been described with reference to particular arrangements and embodiments of services, systems, processors, devices, features and the like, these are not intended to exhaust all possible arrangements or embodiments, and indeed many other modifications and variations will be ascertainable to those of skill in the art.

What is claimed is:

1. A method of gathering data reflecting receipt of and/or exposure to audio data, comprising:
   receiving audio data to be monitored in a monitoring device, the audio data having a monitoring code indicating that the audio data is to be monitored;
   detecting the monitoring code; and
   in response to detection of the monitoring code, producing signature data characterizing the audio data using at least a portion of the audio data containing the monitoring code.

2. The method of claim 1, wherein forming the signature data comprises forming a signature data set reflecting time-domain variations of the received audio data.

3. The method of claim 2, wherein forming the signature data further comprises forming a signature data set reflecting time-domain variations of the received audio data in a plurality of frequency sub-bands of the received audio data.

4. The method of claim 1, wherein forming the signature data comprises forming a signature data set reflecting frequency-domain variations in the received audio data.

5. The method of claim 1, wherein the monitoring code comprises a plurality of substantially single-frequency code components.

6. The method of claim 5, further comprising processing the received audio data to produce signal-to-noise ratios for the plurality of components.

7. The method of claim 1, wherein forming the signature data comprises forming a signature data set comprising signal-to-noise ratios for frequency components of the audio data and/or data representing characteristics of the audio data.

8. The method of claim 7, wherein forming the signature data comprises combining selected ones of the signal-to-noise ratios.

9. The method of claim 7, wherein forming the signature data comprises forming a signature data set reflecting time-domain variations of the signal-to-noise ratios.

10. The method of claim 9, wherein forming the signature data further comprises forming a signature data set reflecting time-domain variations of the signal-to-noise ratios in a plurality of frequency sub-bands of the received audio data.

11. The method of claim 10, wherein the sub-bands are substantially single-frequency sub-bands.

12. The method of claim 7, wherein forming the signature data comprises forming a signature data set reflecting frequency-domain variations of the signal-to-noise ratios.

13. The method of claim 12, wherein the signal-to-noise ratios reflect the ratios of the magnitudes of substantially single-frequency components data to noise levels.

14. The method of claim 1, wherein the audio data comprises a first data set and a second data set, the first data set includes the monitoring code, the signature data characterizes the first data set, and the second data set includes a second monitoring code, further comprising:
    detecting the second monitoring code; and
    in response to detection of the second monitoring code, producing signature data characterizing the second data set using at least a portion of the audio data containing the second monitoring code.

15. The method of claim 1, wherein the produced signature data comprises data obtained from the monitoring code and/or a source identification code included in the audio data.

16. The method of claim 15, wherein the monitoring code and the source identification code occur simultaneously in the audio data.

17. The method of claim 15, wherein the monitoring code and the source identification code occur in different time segments of the audio data.

18. The method of claim 1, further comprising comparing the signature data to reference signature data of identified audio data to identify the received audio data.

19. The method of claim 18, wherein:
    producing the signature data occurs at the location where the audio data is received; and
    comparing the signature data to the reference signature data occurs at a location remote from the location where the audio data is received.

20. The method of claim 18, wherein producing the signature data and comparing the signature data to the reference signature data both occur at the location where the audio data is received.

21. A system for gathering data reflecting receipt of and/or exposure to audio data, comprising:
    an input device to receive, in a monitoring device, audio data having a monitoring code indicating that the audio data is to be monitored;
    a detector to detect the monitoring code; and
    a first processor to produce, in response to detection of the monitoring code, signature data characterizing the audio data using at least a portion of the audio data containing the monitoring code.

22. The system of claim 21, wherein the processor is operative to form the signature data by forming a signature data set reflecting time-domain variations of the received audio data.

23. The system of claim 22, wherein the processor is further operative to form the signature data by forming a signature data set reflecting time-domain variations of the received audio data in a plurality of frequency sub-bands of the received audio data.

24. The system of claim 21, wherein the processor is operative to form the signature data by forming a signature data set reflecting frequency-domain variations in the received audio data.

25. The system of claim 21, wherein the monitoring code comprises a plurality of substantially single-frequency code components.

26. The system of claim 25, further comprising a second processor to process the received audio data to produce signal-to-noise ratios for the plurality of components.

27. The system of claim 21, wherein the first processor is operative to form the signature data by forming a signature data set comprising signal-to-noise ratios for frequency components of the audio data and/or data representing characteristics of the audio data.

28. The system of claim 27, wherein the first processor is operative to form the audio data signature by combining selected ones of the signal-to-noise ratios.

29. The system of claim 27, wherein the first processor is operative to form the signature data by forming a signature data set reflecting time-domain variations of the signal-to-noise ratios.

30. The system of claim 29, wherein the first processor is further operative to form the signature data by forming a signature data set reflecting time-domain variations of the signal-to-noise ratios in a plurality of frequency sub-bands of the received audio data.

31. The system of claim 30, wherein the sub-bands are substantially single-frequency sub-bands.

32. The system of claim 27, wherein the first processor is further operative to form the signature data by forming a signature data set reflecting frequency-domain variations of the signal-to-noise ratios.

33. The system of claim 32, wherein the signal-to-noise ratios reflect the ratios of the magnitudes of substantially single-frequency audio data components to noise levels.

34. The system of claim 21, wherein the audio data comprises a first data set and a second data set, the first data set includes the monitoring code, the signature data characterizes the first data set, and the second data set includes a second monitoring code, and wherein:
the detector is operative to detect the second monitoring code; and
the processor is operative to produce, in response to detection of the second monitoring code, signature data characterizing the second data set using at least a portion of the audio data containing the second monitoring code.

35. The system of claim 21, wherein the produced signature data comprises data obtained from the monitoring code and/or a source identification code included in the audio data.

36. The system of claim 35, wherein the monitoring code and the source identification code occur simultaneously in the audio data.

37. The system of claim 35, wherein the monitoring code and the source identification code occur in different time segments of the audio data.

38. The system of claim 21, further comprising a second processor to compare the signature data to reference signature data of identified audio data to identify the received audio data.

39. The system of claim 38, wherein:
the first processor is located at the same location as the receiver; and
the second processor is located remotely from the receiver.

40. The system of claim 38, wherein the first processor and the second processor are both located at the same location as the input device.

41. A method of gathering data reflecting receipt of and/or exposure to audio data comprising;
receiving audio data to be monitored in a monitoring device, the audio data having a monitoring code occurring continuously throughout a time base of the audio data;
detecting the monitoring code; and
in response to detection of the monitoring code, producing signature data characterizing the audio data.

42. The method of claim 41, wherein forming the signature data comprises forming signature data set reflecting time-domain variations of the received audio data.

43. The method of claim 42, wherein forming the signature data further comprises forming a signature data set reflecting time-domain variations of the received audio data in a plurality of frequency sub-bands of the received audio data.

44. The method of claim 41, wherein forming the signature data comprises forming a signature data set reflecting frequency-domain variations in the received audio data.

45. The method of claim 41, wherein the monitoring code comprises a plurality of substantially single-frequency code components.

46. The method of claim 45, further comprising processing the received audio data to produce signal-to-noise ratios for the plurality of components.

47. The method of claim 41, wherein forming the signature data comprises forming a signature data set comprising signal-to-noise ratios for frequency components of the audio data and/or data representing characteristics of the audio data.

48. The method of claim 47, wherein forming the signature data comprises combining selected ones of the signal-to-noise ratios.

49. The method of claim 47, wherein forming the signature data comprises forming a signature data set reflecting time-domain variations of the signal-to-noise ratios.

50. The method of claim 49, wherein forming the signature data further comprises forming a signature data set reflecting time-domain variations of the signal-to-noise ratios in a plurality of frequency sub-bands of the received audio data.

51. The method of claim 50, wherein the sub-bands are substantially single-frequency sub-bands.

52. The method of claim 47, wherein forming the signature data comprises forming a signature data set reflecting frequency-domain variations of the signal-to-noise ratios.

53. The method of claim 52, wherein the signal-to-noise ratios reflect the ratios of the magnitudes of substantially single-frequency audio data components to noise levels.

54. The method of claim 41, wherein the audio data comprises a first data set and a second data set, the first data set includes the monitoring code, which code occurs continuously throughout a time base of the first data set, the signature data characterizes the first data set, and the second data set includes a second monitoring code, which second monitoring code occurs continuously throughout a time base of the second data set, further comprising:
detecting the second monitoring code; and
in response to detection of the second monitoring code, producing signature data characterizing the second data set.

55. The method of claim 41, wherein the produced signature data comprises data obtained from the monitoring code and/or a source identification code included in the audio data.

56. The method of claim 55, wherein the monitoring code and the source identification code occur simultaneously in the audio data.

57. The method of claim 55, wherein the monitoring code and the source identification code occur in different time segments of the audio data.

58. The method of claim 41, wherein the monitoring code occurs continuously throughout a first portion of the time base of the audio data and provides an indication that it occurs in the first portion, and the audio data includes a second monitoring code, which code occurs continuously throughout a second portion of the time base of the audio data and provides an indication that it occurs in the second portion, further comprising:
detecting the second monitoring code; and
in response to detection of the second monitoring code, producing signature data characterizing the audio data.

59. The method of claim 41, further comprising comparing the signature data to reference signature data of identified audio data to identify the received audio data.

60. The method of claim 59, wherein:
producing the signature data occurs at the location where the audio data is received; and
comparing the signature data to the reference signature data occurs at a location remote from the location where the audio data is received.

61. The method of claim 59, wherein producing the signature data and comparing the signature data to the reference signature data both occur at the location where the audio data is received.

62. A system for gathering data reflecting receipt of and/or exposure to audio data comprising:
an input device to receive, in a monitoring device, audio data to be monitored having a monitoring code occurring continuously throughout a time base of the audio data;
a detector to detect the monitoring code; and
a first processor to produce, in response to detection of the monitoring code, signature data characterizing the audio data.

63. The system of claim 62, wherein the processor is operative to form the signature data by forming a signature data set reflecting time-domain variations of the received audio data.

64. The system of claim 63, wherein the processor is further operative to form the signature data by forming a signature data set reflecting time-domain variations of the received audio data in a plurality of frequency sub-bands of the received audio data.

65. The system of claim 62, wherein the processor is operative to form the signature data by forming a signature data set reflecting frequency-domain variations in the received audio data.

66. The system of claim 62, wherein the monitoring code comprises a plurality of substantially single-frequency code components.

67. The system of claim 66, further comprising a second processor to process the received audio data to produce signal-to-noise ratios for the plurality of components.

68. The system of claim 62, wherein the first processor is operative to form the signature data by forming a signature data set comprising signal-to-noise ratios for frequency components of the audio data and/or data representing characteristics of the audio data.

69. The system of claim 68, wherein the first processor is operative to form the signature data by combining selected ones of the signal-to-noise ratios.

70. The system of claim 68, wherein the first processor is operative to form the signature data by forming a signature data set reflecting time-domain variations of the signal-to-noise ratios.

71. The system of claim 70, wherein the first processor is further operative to form the signature data by forming a signature data set reflecting time-domain variations of the signal-to-noise ratios in a plurality of frequency sub-bands of the received audio data.

72. The system of claim 71, wherein the sub-bands are substantially single-frequency sub-bands.

73. The system of claim 68, wherein the first processor is further operative to form the signature data by forming a signature data set reflecting frequency-domain variations of the signal-to-noise ratios.

74. The system of claim 73, wherein the signal-to-noise ratios reflect the ratios of the magnitudes of substantially single-frequency audio data components to noise levels.

75. The system of claim 62, wherein the audio data comprises a first data set and a second data set, the first data set includes the monitoring code, which code occurs continuously throughout a time base of the first data set, the signature data set includes a second monitoring code, which second monitoring code occurs continuously throughout a time base of the second data set, and wherein:
the detector is operative to detect the second monitoring code; and
the processor is operative to produce, in response to detection of the second monitoring code, signature data characterizing the second data set.

76. The system of claim 62, wherein the produced signature data comprises data obtained from the monitoring code and/or a source identification code included in the audio data.

77. The system of claim 76, wherein the monitoring code and the source identification code occur simultaneously in the audio data.

78. The system of claim 76, wherein the monitoring code and the source identification code occur in different time segments of the audio data.

79. The system of claim 62, wherein the monitoring code occurs continuously throughout a first portion of the time base of the audio data and provides and indication that it occurs in the first portion, and the audio data includes a second monitoring code, which code occurs continuously throughout a second portion of the time base of the audio data and provides an indication that it occurs in the second portion, and wherein:
the detector is operative to detect the second monitoring code; and
the processor is operative to produce, in response to detection of the second monitoring code, signature data characterizing the audio data.

80. The system of claim 62, further comprising a second processor to compare the signature data to reference signature data of identified audio data to identify the received audio data.

81. The system of claim 80, wherein:
the first processor is located at the same location as the receiver; and
the second processor is located remotely from the receiver.

82. The system of claim 80, wherein the first processor and the second processor are both located at the same location as the receiver.

83. A method of gathering data reflecting receipt of and/or exposure to audio data, comprising:
receiving audio data to be monitored in a monitoring device, the audio data having a monitoring code occurring repeatedly therein;
detecting the monitoring code; and
in response to detection of the monitoring code, producing signature data characterizing the audio data.

84. The method of claim 83, wherein forming the signature data comprises forming a signature data set reflecting time-domain variations of the received audio data.

85. The method of claim 84, wherein forming the signature data further comprises forming a signature data set reflecting time-domain variations of the received audio data in a plurality of frequency sub-bands of the received audio data.

86. The method of claim 83, wherein forming the signature data comprises forming a signature data set reflecting frequency-domain variations in the received audio data.

87. The method of claim 83, wherein the monitoring code comprises a plurality of substantially single-frequency code components.

88. The method of claim 87, further comprising processing the received audio data to produce signal-to-noise ratios for the plurality of components.

89. The method of claim 83, wherein forming the signature data comprises forming a signature data set comprising signal-to-noise ratios for frequency components of the audio data and/or data representing characteristics of the audio data.

90. The method of claim 89, wherein forming the signature data comprises combining selected ones of the signal-to-noise ratios.

91. The method of claim 89, wherein forming the signature data comprises forming a signature data set reflecting time-domain variations of the signal-to-noise ratios.

92. The method of claim 91, wherein forming the signature data further comprises forming a signature data set reflecting time-domain variations of the signal-to-noise ratios in a plurality of frequency sub-bands of the received audio data.

93. The method of claim 92, wherein the sub-bands are substantially single-frequency sub-bands.

94. The method of claim 89, wherein forming the signature data comprises forming a signature data set reflecting frequency-domain variations of the signal-to-noise ratios.

95. The method of claim 94, wherein the signal-to-noise ratios reflect the ratios of the magnitudes of substantially single-frequency audio data components to noise levels.

96. The method of claim 83, wherein the audio data comprises a first data set and a second data set, the first data set includes the monitoring code, which code occurs repeatedly throughout the first data set, the signature data characterizes the first data set, and the second data set includes a second monitoring code, which second monitoring code occurs repeatedly throughout the second data set, further comprising:
  detecting the second monitoring code; and
  in response to detection of the second monitoring code, producing signature data characterizing the second data set.

97. The method of claim 83, wherein the produced signature data comprises data obtained from the monitoring code and/or a source identification code included in the audio data.

98. The method of claim 97, wherein the monitoring code and the source identification code occur simultaneously in the audio data.

99. The method of claim 97, wherein the monitoring code and the source identification code occur in different time segments of the audio data.

100. The method of claim 83, wherein the monitoring code occurs repeatedly in a first portion of the audio data and provides an indication that it occurs in the first portion, and the audio data includes a second monitoring code, which code occurs repeatedly in a second portion of the audio data and provides an indication that it occurs in the second portion, further comprising:
  detecting the second monitoring code; and
  in response to detection of the second monitoring code, producing signature data characterizing the audio data.

101. The method of claim 83, further comprising comparing the signature data to reference signature data of identified audio data to identify the received audio data.

102. The method of claim 101, wherein:
  producing the signature data occurs at the location where the audio data is received; and
  comparing the signature data to the reference signature data occurs at a location remote from the location where the audio data is received.

103. The method of claim 101, wherein producing the signature data and comparing the signature data to the reference signature data both occur at the location where the audio data is received.

104. The method of claim 83, wherein the monitoring code repeats at a predetermined interval.

105. The method of claim 83, wherein the monitoring code repeats at one or more variable intervals.

106. A system for gathering data reflecting receipt of and/or exposure to audio data, comprising:
  an input device to receive, in a monitoring device, audio data to be monitored having a monitoring code occurring repeatedly therein;
  a detector to detect the monitoring code; and
  a first processor to produce, in response to detection of the monitoring code, signature data characterizing the audio data.

107. The system of claim 106, wherein the processor is operative to form the signature data by forming a signature data set reflecting time-domain variations of the received audio data.

108. The system of claim 107, wherein the processor is further operative to form the signature data by forming a signature data set reflecting time-domain variations of the received audio data in a plurality of frequency sub-bands of the received audio data.

109. The system of claim 106, wherein the processor is operative to form the signature data by forming a signature data set reflecting frequency-domain variations in the received audio data.

110. The system of claim 106, wherein the monitoring code comprises a plurality of substantially single-frequency code components.

111. The system of claim 110, further comprising a second processor to process the received audio data to produce signal-to-noise ratios for the plurality of components.

112. The system of claim 106, wherein the first processor is operative to form the signature data by forming a signature data set comprising signal-to-noise ratios for frequency components of the audio data and/or data representing characteristics of the audio data.

113. The system of claim 112, wherein the first processor is operative to form the signature data by combining selected ones of the signal-to-noise ratios.

114. The system of claim 112, wherein the first processor is operative to form the signature data by forming a signature data set reflecting time-domain variations of the signal-to-noise ratios.

115. The system of claim 114, wherein the first processor is further operative to form the signature data by forming a signature data set reflecting time-domain variations of the signal-to-noise ratios in a plurality of frequency sub-bands of the received audio data.

116. The system of claim 115, wherein the sub-bands are substantially single-frequency sub-bands.

117. The system of claim 112, wherein the first processor is further operative to form the signature data by forming a signature data set reflecting frequency-domain variations of the signal-to-noise ratios.

118. The system of claim 117, wherein the signal-to-noise ratios reflect the ratios of the magnitudes of substantially single-frequency audio data components to noise levels.

119. The system of claim 106, wherein the audio data comprises a first data set and a second data set, the first data set includes the monitoring code, which code occurs repeatedly throughout the first data set, the signature data set includes a second monitoring code, which second monitoring code occurs repeatedly throughout the second data set, and wherein:

the detector is operative to detect the second monitoring code; and the processor is operative to produce, in response to detection of the second monitoring code, signature data characterizing the second data set.

120. The system of claim 106, wherein the produced signature data comprises data obtained from the monitoring code and/or a source identification code included in the audio data.

121. The system of claim 120, wherein the monitoring code and the source identification code occur simultaneously in the audio data.

122. The system of claim 120, wherein the monitoring code and the source identification code occur in different time segments of the audio data.

123. The system of claim 106, wherein the monitoring code occurs repeatedly in a first portion of the audio data and provides an indication that it occurs in the first portion, and the audio data includes a second monitoring code, which code occurs repeatedly in a second portion of the audio data and provides and indication that it occurs in the second portion, and wherein:

the detector is operative to detect the second monitoring code; and the processor is operative to produce, in response to detection of the second monitoring code, signature data characterizing the audio data.

124. The system of claim 106, further comprising a second processor to compare the signature data to reference signature data of identified audio data to identify the received audio data.

125. The system of claim 124, wherein:

the first processor is located at the same location as the input device; and the second processor is located remotely from the input device.

126. The system of claim 124, wherein the first processor and the second processor are both located at the same location as the receiver.

127. The system of claim 106, wherein the monitoring code repeats at a predetermined interval.

128. The system of claim 106, wherein the monitoring code repeats at one or more variable intervals.

* * * * *